United States Patent
Vo et al.

(10) Patent No.: US 10,421,429 B2
(45) Date of Patent: Sep. 24, 2019

(54) LOAD-LIMITING SEATBELT RETRACTOR

(71) Applicant: Ford Global Technologies, LLC, Dearborn, MI (US)

(72) Inventors: Jeffrey Tien Vo, Southfield, MI (US); Brian Robert Spahn, Plymouth, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 35 days.

(21) Appl. No.: 15/679,814

(22) Filed: Aug. 17, 2017

(65) Prior Publication Data
US 2019/0054893 A1 Feb. 21, 2019

(51) Int. Cl.
*B60R 22/38* (2006.01)
*B60R 22/46* (2006.01)
*B60R 22/343* (2006.01)

(52) U.S. Cl.
CPC .............. *B60R 22/38* (2013.01); *B60R 22/46* (2013.01); *B60R 22/343* (2013.01)

(58) Field of Classification Search
CPC . B60R 22/28; B60R 2202/284; B60R 22/341; B60R 22/3413; B60R 22/4676; B60R 22/46
USPC ........................................ 280/805; 242/422.2
See application file for complete search history.

(56) References Cited

U.S. PATENT DOCUMENTS

| 6,019,392 | A | * | 2/2000 | Karlow | B60R 22/28 |
| | | | | | 242/381 |
| 6,360,981 | B1 | * | 3/2002 | Specht | B60R 22/44 |
| | | | | | 242/379 |
| 6,705,559 | B1 | | 3/2004 | Sullivan et al. | |
| 6,863,236 | B2 | | 3/2005 | Kempf et al. | |
| 6,916,045 | B2 | | 7/2005 | Clancy, III et al. | |
| 7,686,339 | B2 | | 3/2010 | Rogers | |
| 2005/0205712 | A1 | * | 9/2005 | Aisenbrey | B29C 45/0013 |
| | | | | | 242/422.2 |
| 2007/0114318 | A1 | * | 5/2007 | Thogersen | B60R 22/341 |
| | | | | | 242/381 |
| 2011/0303779 | A1 | * | 12/2011 | Mizuno | B60R 22/3413 |
| | | | | | 242/379.1 |
| 2012/0234958 | A1 | * | 9/2012 | Stroik, Jr. | B60R 22/341 |
| | | | | | 242/379.1 |
| 2014/0008478 | A1 | | 1/2014 | Bergman | |
| 2018/0269769 | A1 | * | 9/2018 | Allington | B60L 7/28 |

FOREIGN PATENT DOCUMENTS

| DE | 102006006795 A1 | 8/2007 | |
| DE | 102008042020 A1 | 3/2010 | |
| DE | 10 2013 217 238 | * 3/2015 | ............ B60R 22/34 |
| WO | 2016089228 A1 | 6/2016 | |

\* cited by examiner

*Primary Examiner* — Frank B Vanaman
(74) *Attorney, Agent, or Firm* — Frank A. MacKenzie; Bejin Bieneman PLC

(57) ABSTRACT

A seatbelt retractor includes a housing and a spool rotatably supported by the housing. A torsion bar has a first end and a second end. The first end of the torsion bar is fixed to the spool, and the second end of the torsion bar is fixable relative to the housing. The seatbelt retractor includes a magnet and a rotor disposed adjacent the magnet. One of the magnet and the rotor being fixed relative to the spool and the other of the magnet and the rotor being rotatable relative to the spool. The rotor includes a conductive material.

18 Claims, 7 Drawing Sheets

LOAD-LIMITING SEATBELT RETRACTOR

BACKGROUND

A seatbelt in a vehicle may be equipped with "load limiting" features. During a collision, a retractor of the seatbelt may lock webbing of the seatbelt from further extension from the retractor, but load-limiting features permit some additional limited extension of the webbing when the force exerted on the webbing exceeds a load-limiting threshold. This additional extension of the webbing from the retractor limits the load applied by the webbing to the chest of an occupant to reduce the chest deflection.

Load limiting may be achieved through use of a torsion bar. The retractor includes a housing and the spool is rotatable relative to the housing. One end of the torsion bar may be connected to a spool around which the webbing is wound in the retractor. When the torsion bar is not engaged, the torsion bar and the spool both rotate relative to the housing as the webbing is pulled from/retracted to the retractor. In the event of a collision, the other end of the torsion bar may be fixed relative to a housing of the retractor. As an occupant exerts a force tending to extract the webbing from the retractor, the spool applies a twisting force to the torsion bar. The torsion bar yields, that is, deforms, at a known threshold force. The force imparted to an occupant through the seatbelt is thus limited by the threshold force of the torsion bar.

DETAILED DESCRIPTION

Figure 1:
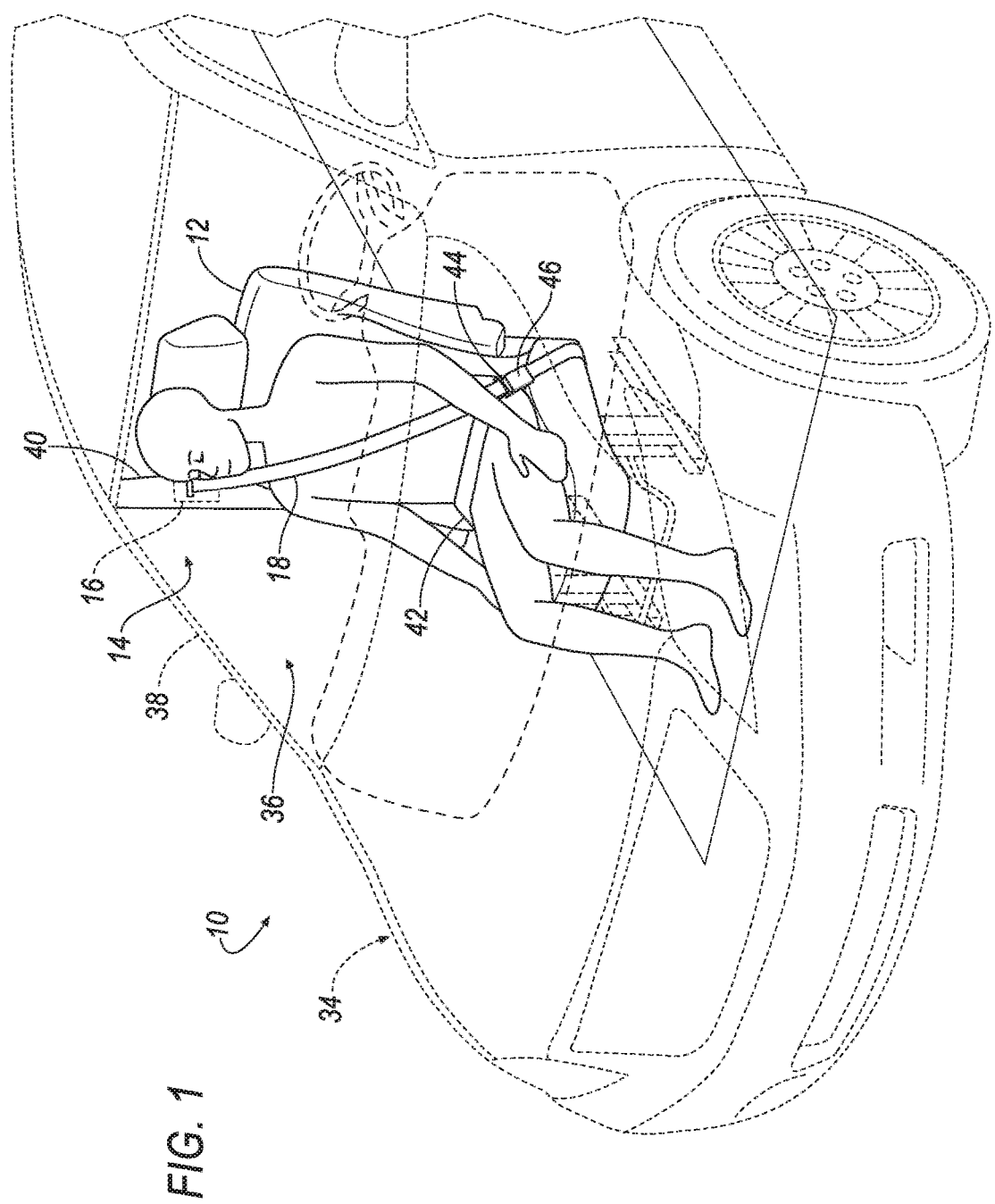
FIG. 1 is a perspective view of a vehicle seat with a restraint system in a vehicle.

A seatbelt retractor includes a housing and a spool rotatably supported by the housing. A torsion bar has a first end and a second end. The first end is fixed to the spool, and the second end is fixable relative to the housing. The seatbelt retractor includes a magnet and a rotor disposed adjacent the magnet. One of the magnet and the rotor is fixed relative to the spool and the other of the magnet and the rotor is rotatable relative to the spool. The rotor includes a conductive material.

The seatbelt retractor may include a plurality of magnets. The magnets may be spaced from each other along the torsion bar. The magnets may each extend circumferentially from the torsion bar. The rotor may be disposed between the magnets. The rotor may extend circumferentially from the torsion bar.

The magnets may be spaced from each other circumferentially about the torsion bar. The rotor may extend around the magnets about the torsion bar. The rotor may be fixed to the spool.

The seatbelt retractor may include a plate supported by the torsion bar and including a plurality of notches spaced from each other circumferentially about the torsion bar. One magnet may be disposed in each notch.

The spool may include a first end and a second end spaced from each other along an axis. The spool and the torsion bar may extend coaxially from respective first ends to respective second ends. The first end of the torsion bar may be coupled to the first end of the spool. The magnets may be disposed between the first end and the second end of the spool. The first end of the torsion bar may extend outwardly from the first end of the spool. The first end of the spool may be disposed between the second end of the spool and the magnet.

The spool may define a cavity extending circumferentially about the axis. The magnets may be disposed in the cavity.

The spool may include a slot extending circumferentially about the axis. The magnets may be disposed in the slot.

The seatbelt retractor may include a webbing having an end. The end of the webbing may be attached to the spool.

With reference to the Figures, wherein like numerals indicate like parts throughout the several views, a vehicle 10 is generally shown. The vehicle 10 includes a seat 12 and a restraint system 14 having a seatbelt retractor 16 and a webbing 18 engaged with the seatbelt retractor 16. During a vehicle impact, the momentum of an occupant biases the occupant relative to the seat 12. For example, in a front impact or an oblique impact, the momentum of the occupant may bias the occupant away from the seat 12. When the occupant moves away from the seat 12, the restraint system 14, e.g., the webbing 18, may exert a force F on the occupant to retain the occupant on the seat 12. During the vehicle impact, the seatbelt retractor 16 may exert a drag force Fd counteracting the force exerted by the webbing 18 to allow for load-limiting when the webbing 18 retains the occupant on the seat 12. Specifically, the seatbelt retractor 16 may apply the drag force Fd to control the payout of the webbing 18 during high loads to reduce chest compression of the occupant during the vehicle impact. In this situation, the seatbelt retractor 16 may absorb energy to decrease the force exerted on the chest of the occupant by the webbing 18 during the vehicle impact.

Figure 2:
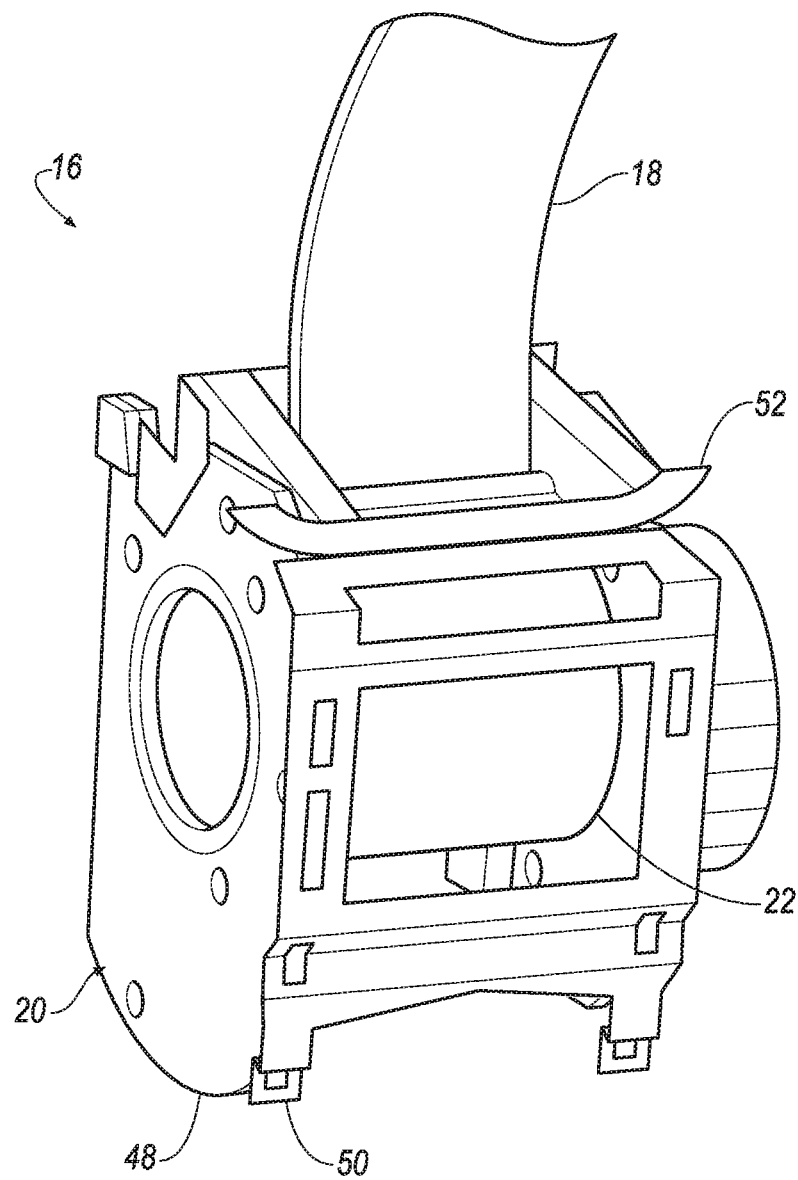
FIG. 2 is a perspective view of a portion of the restraint system including a seatbelt retractor and a webbing engaged with the seatbelt retractor.
Figure 3:
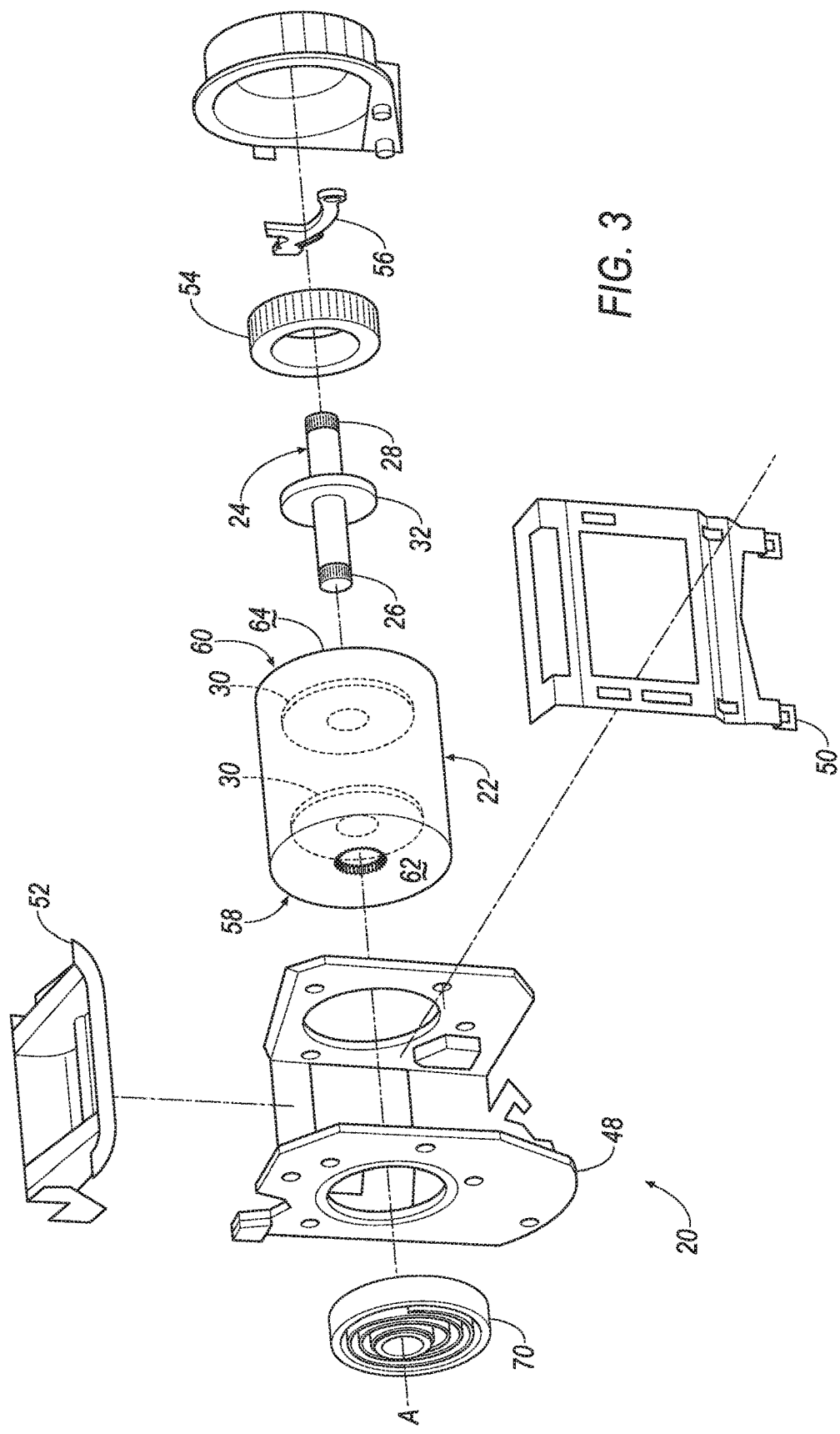
FIG. 3 is an exploded view of a seatbelt retractor of the restraint system.

With reference to FIGS. 2 and 3, the seatbelt retractor 16 includes a housing 20 and a spool 22 rotatably supported by the housing 20. The seatbelt retractor 16 includes a torsion bar 24 having a first end 26 and a second end 28. The first end 26 of the torsion bar 24 is fixed to the spool 22, and the second end 28 of the torsion bar 24 is fixable relative to housing 20. The seatbelt retractor 16 includes a magnet 30 and a rotor 32 disposed adjacent the magnet 30. One of the magnet 30 and the rotor 32 is fixed relative to the spool 22 and the other of the magnet 30 and the rotor 32 is rotatable relative to the spool 22. The rotor 32 includes a conductive material.

During the vehicle impact, the seatbelt retractor 16 is in a locked position and the second end 28 of the torsion bar 24 is prevented from rotating relative to the housing 20, as set forth further below. In this situation, as the occupant exerts a force on the webbing 18 during the vehicle impact, the first end 26 of the torsion bar 24 rotates relative to the second end 28 of the torsion bar 24. When the first end 26 of the torsion bar 24 rotates relative to the second end 28 of the torsion bar 24, the magnet 30 and the rotor 32 rotate relative to each other. By allowing one of the magnet 30 and the rotor 32 to rotate relative to the other of the magnet 30 and the rotor 32, the seatbelt retractor 16 exerts the drag force Fd to assist in reducing the force F exerted by the webbing 18 and in reducing chest compression of the occupant during the vehicle impact.

With reference to FIG. 1, the vehicle 10 may, for example, be any suitable type of automobile. The vehicle 10 may include a vehicle body 34 defining a passenger cabin 36 to house occupants, if any, of the vehicle 10. The vehicle body 34 may include a floor and a plurality of pillars 38, 40 extending in an upward direction from the floor. For example, the pillars 38, 40 may include an A-pillar 38 and a B-pillar 40 spaced from the A-pillar 38. The pillars 38, 40 may include additional pillars, e.g., a C-pillar (not shown).

With continued reference to FIG. 1, one or more seats 12 may be disposed at a front of the passenger cabin 36, e.g., between the A-pillar 38 and the B-pillar 40. In this situation, the seats 12 may be front seats. The passenger cabin 36 may include one or more rear seats (not shown) disposed behind the front seats. The passenger cabin 36 may also include third-row seats (not shown) at a rear (not numbered) of the passenger cabin 36, in which case the seats 12 may be second-row seats (not numbered) instead of or in addition to being front seats. As shown in FIG. 1, the seat 12 is a bucket seat, but the seats 12 may be other suitable types of seats, e.g., a bench seat.

The restraint system 14 may include the seatbelt retractor 16 and the webbing 18 retractably payable from the seatbelt retractor 16, as shown in FIG. 2. The restraint system 14 may include an anchor 42 coupled to the webbing 18, and a clip 44 that engages a buckle 46. The restraint system 14 may be disposed adjacent the seat 12. For example, the restraint system 14 is adjacent the front seat 12, as shown in FIG. 1. The restraint system 14, when fastened, retains the occupant on the seat 12, e.g., during sudden decelerations of the vehicle 10.

The anchor 42 attaches one end of the webbing 18 to the seat 12. The other end of the webbing 18 feeds into the seatbelt retractor 16. The clip 44 slides freely along the webbing 18 and, when engaged with the buckle 46, divides the webbing 18 into a lap band and a shoulder band.

The restraint system 14 may be a three-point harness, meaning that the webbing 18 is attached at three points around the occupant when fastened: the anchor 42, the seatbelt retractor 16, and the buckle 46. The restraint system 14 may, alternatively, include another arrangement of attachment points.

With reference to FIG. 2, the housing 20 may include a housing body 48 and a housing cover 50 attached to the housing body 48. The housing 20 may be formed of metal or plastic. A webbing guide 52 may be attached to the housing 20. The housing 20 may be mounted to the vehicle body 34. For example, the housing 20 may be attached to the B-pillar 40, as shown in FIG. 1. As another example, when the restraint system 14 is adjacent the rear seat, the housing 20 may be attached to the C-pillar. Alternatively, the housing 20 may be attached to the seat 12. The housing 20 may be attached to the vehicle body 34 in any suitable manner, e.g., fasteners.

The seatbelt retractor 16 may be moveable from an unlocked position to the locked position. In the unlocked position, the spool 22 freely rotates within the housing 20 to allow the webbing 18 to be extended from and retracted into the seatbelt retractor 16. In the unlocked position, the torsion bar 24 may rotate with the spool 22. In the locked position, the second end 60 of the spool 22 is rotationally locked relative to the housing 20, which prevents extension of the webbing 18 from the seatbelt retractor 16 to limit the forward movement of the occupant. In this situation, the second end 28 of the torsion bar 24 is fixed relative to the housing 20, as set forth above. The seatbelt retractor 16 may be in the unlocked position by default, i.e., in the absence of a sudden deceleration. The seatbelt retractor 16 may change from the unlocked position to the locked position during a sudden deceleration of the vehicle 10, i.e., deceleration triggers components of the seatbelt retractor 16 to change from the unlocked position to the locked position.

The seatbelt retractor 16 may include a locking device (not numbered) for fixing the second end 28 of the torsion bar 24, i.e., the spool 22, relative to the housing 20. The locking device may include a ratchet 54 and a pawl 56 engageable with the ratchet 54. For example, the second end 28 of the torsion bar 24 may be attached to the ratchet 54 and the pawl 56.

With reference to FIG. 3, the ratchet 54 includes a plurality of teeth, which are aligned circumferentially around and extend radially from the ratchet 54. Each tooth includes a first side (not numbered) and a second side (not numbered), wherein the first side has a shallower angle relative to a circumference of the ratchet 54 than the second side. When the ratchet 54 rotates relative to the pawl 56 such that the first sides of the teeth are presented to the pawl 56, the pawl 56 slides over the teeth, and when the ratchet 54 rotates relative to the pawl 56 such that the second sides of the teeth are presented to the pawl 56, the pawl 56 catches on the second side and prevents rotation of the ratchet 54.

With continued reference to FIG. 3, the pawl 56 is hingedly coupled to the housing 20. The pawl 56 is movable between a disengaged position spaced from the ratchet 54 and an engaged position engaging the ratchet 54. The pawl 56 has a hinged end and a free end. In the disengaged position, the free end is spaced from the ratchet 54. In the engaged position, the free end is touching the ratchet 54.

The seatbelt retractor 16 may include an activation sensor (not shown) that senses sudden deceleration of the vehicle 10 and triggers activation of the locking device, e.g., the ratchet 54 and pawl 56, to engage the second end 28 of the torsion bar 24. The activation sensor may be in communication with the pawl 56, either directly or indirectly through a controller (not shown). The activation sensor may be in the seatbelt retractor 16 or elsewhere in the vehicle 10. In the seatbelt retractor 16, the activation sensor may be, for example a weighted pendulum, a centrifugal clutch, or any other suitable type. In the vehicle 10 outside the seatbelt retractor 16, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

As set forth further below, several embodiments of the seatbelt retractor 16 are shown in each of FIGS. 4-7, respectively. Each embodiment may include any suitable number of magnets 30, i.e., one or more. For example, each embodiment shown in FIGS. 4-7 include a plurality of magnets 30, i.e., more than one. Specifically, in the embodiment shown in FIG. 4, the magnets 30 may be spaced from each other along the torsion bar 24 and enclosed by the spool 22. In the embodiment shown in FIG. 5, the magnets 30 may be spaced from each other along the torsion bar 24 and spaced from the spool 22. In the embodiment shown in FIG. 6, the magnets 30 may be spaced from each other around the torsion bar 24. In the embodiment shown in FIG. 7, the magnets 30 may be spaced from each other around the torsion bar 24 and enclosed by the spool 22. Common numerals are used to identify common features in the embodiments.

With reference to FIG. 3, the spool 22 may be rotatably coupled to the housing 20. The spool 22 may freely rotate relative to the housing 20. For example, the spool 22 may rotate relative to the housing 20 about an axis A. The spool 22 may be cylindrical in shape. The spool 22 may be adapted to receive the webbing 18, for example, by including a webbing 18 attachment slot (not shown) and permitting the webbing 18 to wind around the spool 22.

With continued reference to FIG. 3, the spool 22 may include a first end 58 and a second end 60 spaced from each other along the axis A. The spool 22 may extend annularly about the axis A. In other words, the first end 58 and the second end 60 of the spool 22 may extend annularly about the axis A. The spool 22 may have a constant cross-section along the axis A. For example, the spool 22 may have a circular cross-section.

The spool 22 may include a first wall 62 at the first end 58 of the spool 22 and a second wall 64 at the second end 60 of the spool 22. The first wall 62 and the second wall 64 may enclose the first end and the second end 60 of the spool 22, respectively. The first wall 62 and the second wall 64 may have any suitable shape. For example, the first wall 62 and the second wall 64 may have an annular shape. In other words, the first wall 62 and the second wall 64 may extend annularly about the axis A to the first end and the second end 60 of the spool 22, respectively.

Figure 4:
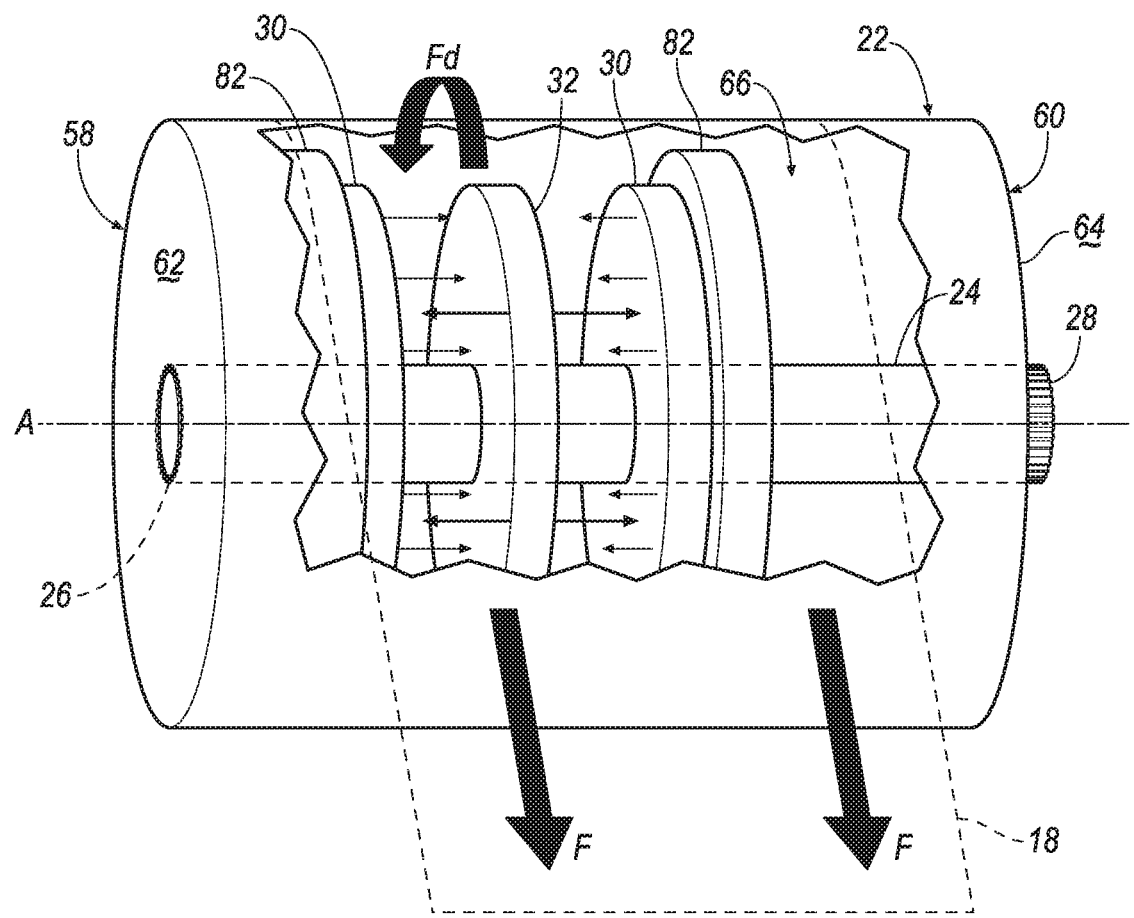
FIG. 4 is a perspective view of one embodiment of the seatbelt retractor.
Figure 6:
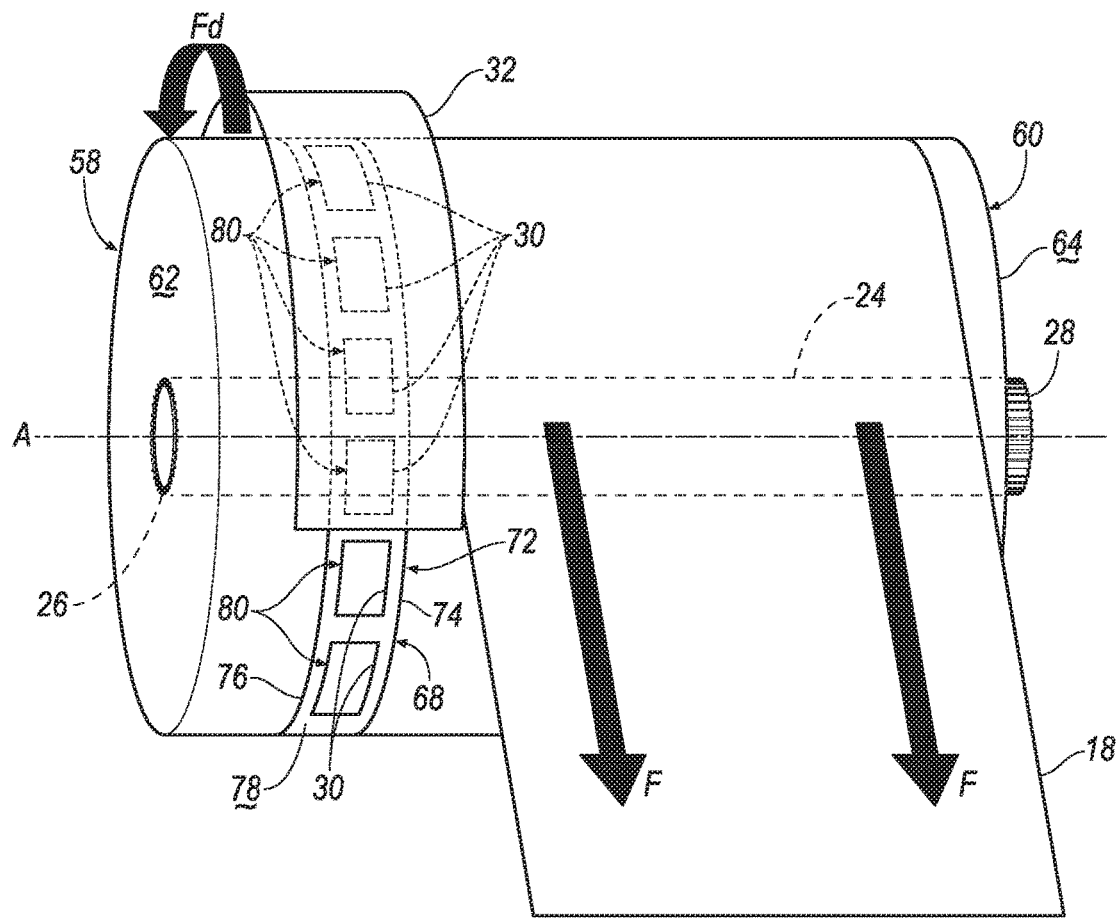
FIG. 6 is a perspective view of another embodiment of the seatbelt retractor.
Figure 7:
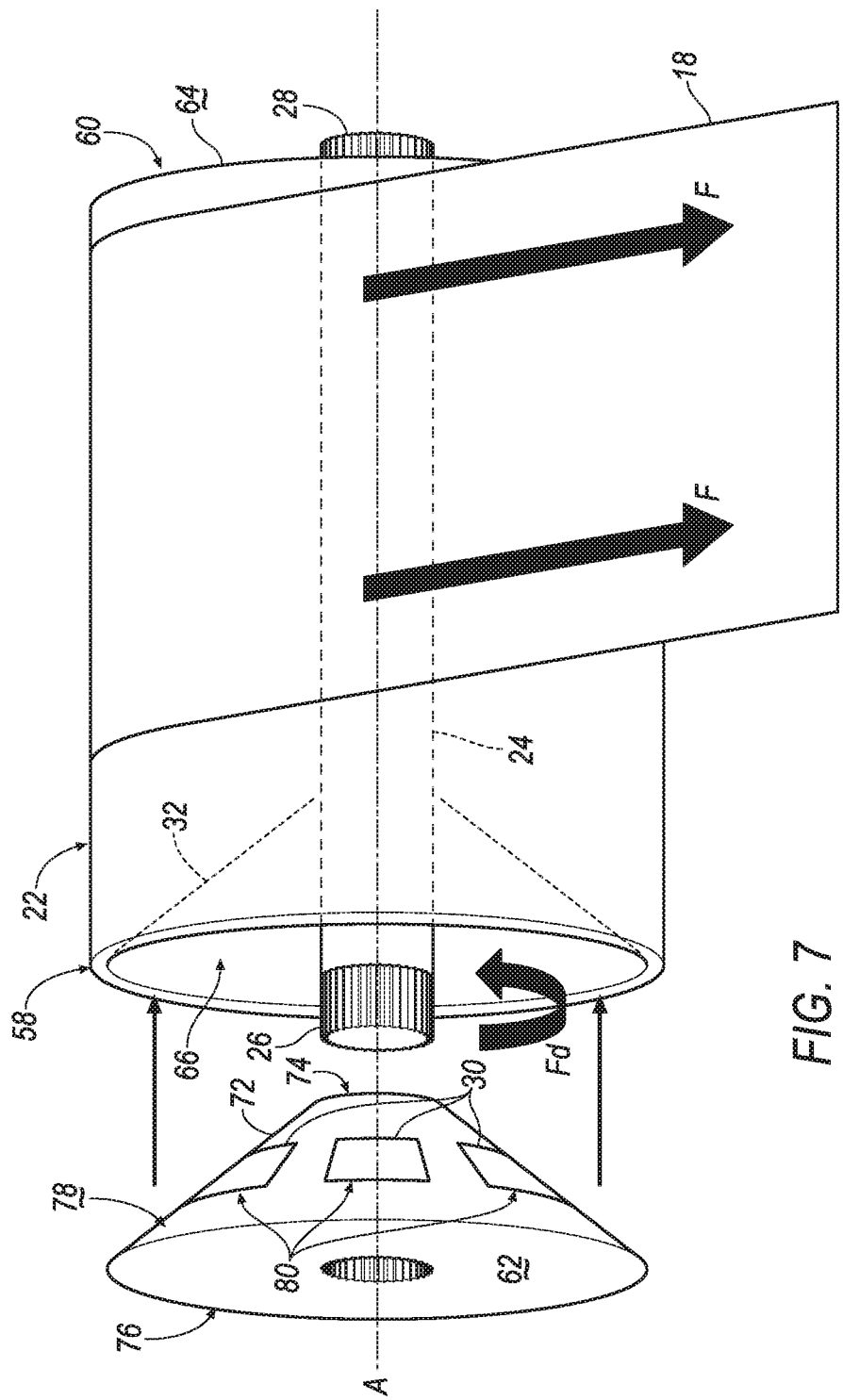
FIG. 7 is a perspective view of another embodiment of the seatbelt retractor.

With reference to FIGS. 4 and 7, the spool 22 may include a cavity 66 extending from the first end to the second end 60 of the spool 22. The cavity 66 may extend circumferentially along the spool 22, i.e., along the axis A. The cavity 66 may have a constant cross-section along the axis A. For example, the cavity 66 may have a circular cross-section. In the embodiment shown in FIG. 6, the spool 22 may include a slot 68 extending circumferentially about the axis A. The slot 68 may extend through the spool 22 to the cavity 66. The slot 68 may extend any suitable amount along the axis A. The slot 68 may be disposed between the first end and the second end 60 of the spool 22.

The webbing 18 may be attached to the spool 22. Specifically, one end of the webbing 18 may be attached to the anchor 42, as set forth above, and the other end of the webbing 18 may be attached to the spool 22, with the webbing 18 wound around the spool 22 beginning at that end. The webbing 18 may be formed of fabric in the shape of a strap.

With reference to FIG. 3, a spool spring 70 may be coupled to the spool 22 and the housing 20. The spool spring 70 may be loaded in tension or compression when the webbing 18 is fully retracted, and the spool spring 70 may be further loaded in either tension or compression when the webbing 18 is extended from the spool 22. Thus, the spool spring 70 may exert a force tending to retract the webbing 18. The spool spring 70 may be a spiral torsion spring or any other suitable type of spring.

The first end 26 and the second end 28 of the torsion bar 24 may be spaced from each other along the axis A, as shown in FIG. 3. In other words, the torsion bar 24 and the spool 22 may extend coaxially from respective first ends to respective second ends. The first end 26 of the torsion bar 24 may be coupled to the first end 58 of the spool 22. For example, a cog (not numbered) of the first end 26 of the torsion bar 24 may mesh with a cog (not numbered) of the first end 58 of the spool 22, as shown in FIG. 3. In this situation, the first end 26 of the torsion bar 24 may be fixed relative to the first end 58 of the spool 22. The second end 28 of the torsion bar 24 may extend outwardly from the second end 60 of the spool 22. In other words, the second end 28 of the torsion bar 24 may extend through the second wall 64 of the spool 22.

The torsion bar 24 may extend any suitable amount along the axis A. For example, in the embodiment shown in FIG. 4, the torsion bar 24 may extend from the first end, i.e., the first wall 62, of the spool 22. In the embodiments shown in FIGS. 5-7, the first end 26 of the torsion bar 24 may extend outwardly from the first end, i.e., the first wall 62, of the spool 22. In other words, the first end 26 of the torsion bar 24 and the second end 28 of the torsion bar 24 may each extend outwardly from the first end and the second end 60 of the spool 22, respectively. In this situation, the torsion bar 24 may extend farther along the axis A than the spool 22.

The torsion bar 24 may be designed to rotationally yield, that is, plastically deform, as the torsion bar 24 is rotated by the spool 22 but fixed by the ratchet 54. In particular, the torsion bar 24 may be formed of suitable shape, dimension, and material to yield when subjected to a threshold rotational force. For example, if the ratchet 54 is engaged but the webbing 18 exerts the force F on the spool 22, the torsion bar 24 may prevent the spool 22 from rotating unless the force F exceeds a threshold, in which case the rotational yielding may permit the spool 22 to rotate.

When the torsion bar 24 is yielding, the one of the magnets 30 and the rotor 32 fixed to the torsion bar 24 rotates relative to the other of the magnets 30 and the rotor 32 fixed to the spool 22. For example, the first end 26 of the torsion bar 24, i.e., the spool 22, may rotate relative to the second end 28 of the torsion bar 24 when the ratchet 54 is engaged with the second end 28 of the torsion bar 24. The first end 26 of the torsion bar 24 may rotate more than the second end 28 of the torsion bar 24, i.e., the rotation of the torsion bar 24 may increase along the torsion bar 24 from the second end 28 to the first end 26. In this situation, one of the magnets 30 and the rotor 32 may have a velocity relative to the other of the magnets 30 and the rotor 32. The velocity may progressively increase as the torsion bar 24 is twisted.

As one of the magnets 30 and the rotor 32 rotates relative to the other of the magnets 30 and the rotor 32, the seatbelt retractor 16 may exert the drag force Fd to increase the load by the webbing 18 and absorb energy from the occupant during the vehicle impact. The drag force Fd may counteract the force F of the webbing 18, as set forth above, and may be proportional to the velocity of one of the magnets 30 and the rotor 32, i.e., the drag force Fd may increase when the velocity increases. The torsion bar 24 may progressively increase the load by the webbing 18; i.e., the force to rotationally yield the torsion bar 24 may increase as the drag force Fd increases, i.e., as the torsion bar 24 is rotated, such that the load by the webbing 18 is progressively increased as the torsion bar 24 further twists.

The drag force Fd may be formed by an eddy current. The relative motion of the rotor 32 with respect to the magnets 30 may induce an electric current in the rotor 32. Specifically, the magnets 30 may include a magnetic field, and the relative motion of the rotor 32 with respect to the magnetic field may induce the electric current in the rotor 32. The electric current may flow in an opposite direction of the velocity of one of the rotor 32 and the magnets 30. In other words, the electric current may flow in an opposite direction of the force F. The electric current may cause a counter magnetic field that exerts the drag force Fd opposing the relative motion of the rotor 32 and the magnets 30.

With reference to FIGS. 6 and 7, the seatbelt retractor 16 may include a plate 72 supported by the torsion bar 24. The plate 72 may, for example, be fixed to the torsion bar 24. In other words, the plate 72 may rotate relative to the spool 22 when the torsion bar 24 is yielding. The plate 72 may be disposed at any suitable position along the axis A. For example, in the embodiment shown in FIG. 6, the plate 72 may be disposed in the slot 68 of the spool 22. In the embodiment shown in FIG. 7, the plate 72 may be disposed at the second end 60 of the spool 22. In this situation, the plate 72 may be the second wall 64 of the spool 22, i.e., enclose the first end 58 of the spool 22.

With continued reference to FIGS. 6 and 7, the plate 72 may extend along the torsion bar 24, i.e., the axis A, from a first side 74 to a second side 76. The plate 72 may extend circumferentially from the torsion bar 24 to a surface 78 spaced from the torsion bar 24. The surface 78 may extend along the axis A from the first side 74 to the second side 76 of the plate 72. The surface 78 may include a plurality of notches 80 spaced from each other about the axis A. In other words, the plurality of notches 80 may be spaced circumferentially about the axis A. The notches 80 may be disposed at any suitable location on the surface 78, i.e., between the first side 74 and the second side 76 of the plate 72. The notches 80 may extend from the surface 78 towards the axis A. In other words, the notches 80 may be a cutout on the surface 78 of the plate 72. The notches 80 may have any suitable shape, e.g., rectangular, square, etc.

The plate 72 may have any suitable shape. For example, in the embodiment shown in FIG. 6, the plate 72 may have a circular shape. In the embodiment shown in FIG. 7, the plate 72 may have a frustum shape.

Figure 5:
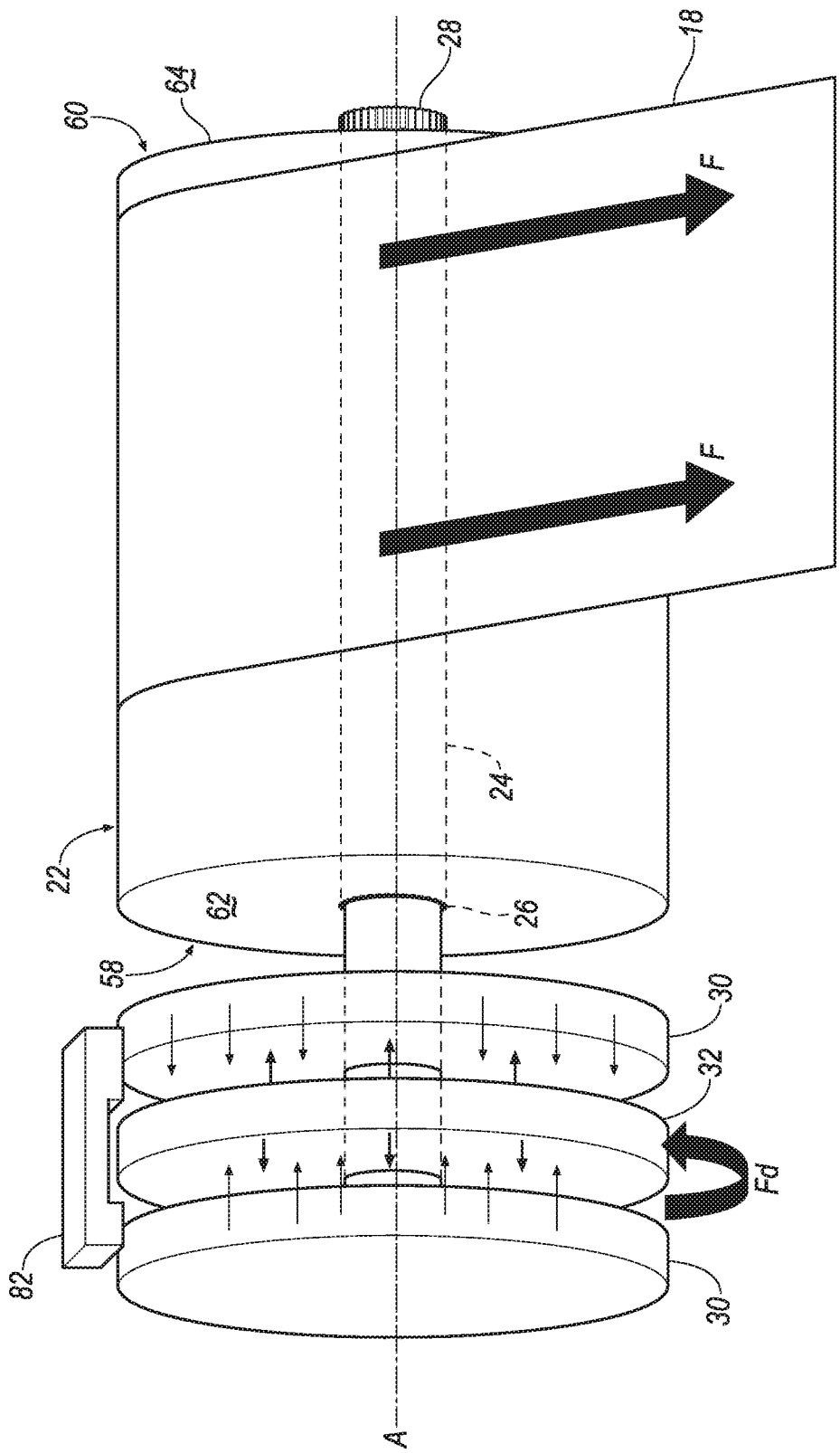
FIG. 5 is a perspective view of another embodiment of the seatbelt retractor.

The magnets 30 may be supported by any suitable component of the seatbelt retractor 16. For example, in the embodiments shown in FIGS. 4 and 5, the seatbelt retractor 16 may include a support 82 fixed relative to the spool 22. Specifically, in the embodiment shown in FIG. 4, the support 82 may be disposed in the cavity 66 of the spool 22 and fixed to the spool 22. In the embodiment shown in FIG. 5, the support 82 may be fixed to the spool 22, directly or through intermediate components, e.g., a bar (not shown) extending from the spool 22 to the support 82. The support 82 may, for example, extend along the axis A from one magnet to the other magnet, as shown in FIG. 5. In the embodiments shown in FIGS. 6 and 7, the support 82 may be the plate 72 and may be fixed to the torsion bar 24. In this situation, the magnets 30 may be disposed in the plurality of notches 80 on the plate 72. Specifically, one magnet may be disposed in each notch. In the embodiment shown in FIG. 7, the one surface 76 of the plate 72 may be the first wall 62 of the spool 22.

The magnets 30 may be disposed in any suitable position along the axis A. For example, in the embodiments shown in FIGS. 4, 6, and 7, the magnets 30 may be disposed between the first end and the second end 60 of the spool 22. Specifically, in the embodiments shown in FIGS. 4 and 7, the magnets 30 may be disposed in the cavity 66 of the spool 22. In the embodiment shown in FIG. 6, the magnets 30 may be disposed in the slot 68 of the spool 22. In the embodiment shown in FIG. 5, the magnets 30 may be disposed external to the cavity 66 of the spool 22. In other words, the first end 58 of the spool 22 may be disposed between the second end 60 of the spool 22 and the magnets 30.

The magnets 30 may be spaced from each other in any suitable manner. For example, in the embodiments shown in FIGS. 4 and 5, the magnets 30 may be spaced from each other along the torsion bar 24, i.e., the axis A. In the embodiments shown in FIGS. 6 and 7, the magnets 30 may be spaced from each other circumferentially about the torsion bar 24, i.e., the axis A.

The magnets 30 may have any suitable shape. For example, in the embodiments shown in FIGS. 4 and 5, the magnets 30 may extend circumferentially from the torsion bar 24. In this situation, the magnets 30 may have an annular shape such that the torsion bar 24 extends through a hole (not numbered) of the magnets 30. In the embodiments shown in FIGS. 6 and 7, the magnets 30 may have a same shape as the notch, e.g., rectangular, square, etc.

The rotor 32 is disposed adjacent the magnets 30, as set forth above. For example, in the embodiments shown in FIGS. 4 and 5, the rotor 32 may be disposed between the magnets 30 along torsion bar 24, i.e., the axis A. Specifically, in the embodiment shown in FIG. 4, one magnet may be disposed between the rotor 32 and the first end 58 of the spool 22, i.e., the first end 26 of the torsion bar 24, and another magnet may be disposed between the rotor 32 and the second end 60 of the spool 22, i.e., the second end 60 of the spool 22. In embodiment shown in FIG. 5, the first end 58 of the spool 22 may be disposed between the second end 60 of the spool 22 and the rotor 32. In this situation, one magnet may be disposed between the rotor 32 and the first end 58 of the spool 22. In the embodiments shown in FIGS. 6 and 7, the rotor 32 may extend around the magnets 30 about the torsion bar 24, i.e., the axis A. In other words, the magnets 30 may be disposed between the rotor 32 and the torsion bar 24.

The rotor 32 may be supported by any suitable component of the seatbelt retractor 16. For example, in the embodiments shown in FIGS. 4, 5, and 7, the rotor 32 may be supported by the torsion bar 24. Specifically, the rotor 32 may be fixed to the torsion bar 24. In this situation, the rotor 32 may extend circumferentially from the torsion bar 24. In the embodiment shown in FIG. 6, the rotor 32 may be supported by the spool 22. In other words, the rotor 32 may be fixed to the spool 22, i.e., relative to the torsion bar 24. In this situation, the rotor 32 may be spaced from the torsion bar 24 and extend circumferentially about the axis A.

The rotor 32 may have any suitable shape. For example, in the embodiments shown in FIGS. 4-6, the rotor 32 may have an annular shape. In the embodiment shown in FIG. 7, the rotor 32 may have a frustum shape.

The rotor 32 may be formed of any suitable electrically conductive material. In other words, the rotor 32 may be formed of any material suitable for carrying an electric current. For example, the rotor 32 may be formed of any suitable metal, e.g., steel, copper, aluminum, etc.

During the vehicle impact, the activation sensor may trigger the locking device, e.g., engage the pawl 56 with the ratchet 54. The pawl 56 may move from the unlocked position to the locked position, engaging the ratchet 54. Substantially simultaneously, an occupant of the seat 12 has forward momentum relative to the seat 12 and exerts a tensile force on the webbing 18. The tensile force in the webbing 18 tends to pull the webbing 18 from the spool 22. The ratchet 54, connected to the spool 22 through the torsion bar 24, may prevent rotation of the spool 22 until the tensile force in the webbing 18 exceeds the threshold force to cause the torsion bar 24 to deform.

As the torsion bar 24 deforms, one of the magnets 30 and the rotor 32 move relative to each other because one of the magnets 30 and the rotor 32 is fixed relative to the spool 22 and the other of the magnets 30 and the rotor 32 rotates relative to the spool 22. For example, in the embodiments shown in FIGS. 4-6, the magnets 30 are fixed relative to the spool 22 and the rotor 32 rotates relative to the spool 22. In the embodiment shown in FIG. 6, the rotor 32 is fixed relative to the spool 22 and the magnets 30 rotate relative to the spool 22. When the rotor 32 and the magnets 30 rotate relative to each other, the force F exerted by the webbing 18 is counteracted by the drag force Fd such that the seatbelt retractor 16 limits the load exerted by the webbing 18 on the occupant. The limited load may assist in reducing chest compression of the occupant and absorbing energy from the occupant during the vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
a housing;
a spool rotatably supported by the housing;
a torsion bar having a first end and a second end, the first end being fixed to the spool, and the second end being fixable relative to the housing;
a plurality of magnets spaced from each other circumferentially about the torsion bar;
a rotor disposed adjacent the magnets, one of the magnets and the rotor being fixed relative to the spool and the other of the magnets and the rotor being rotatable relative to the spool, the rotor including a conductive material;
wherein the rotor extends around the magnets about the torsion bar; and
a plate including a plurality of notches spaced from each other circumferentially about the torsion bar, one magnet disposed in each notch.

2. The seatbelt retractor of claim 1, wherein the rotor is fixed to the spool.

3. The seatbelt retractor of claim 1, wherein the spool includes a first end and a second end spaced from each other along an axis.

4. The seatbelt retractor of claim 3, wherein the torsion bar and the spool extend coaxially from respective first ends to respective second ends.

5. The seatbelt retractor of claim 3, wherein the first end of the torsion bar is fixed to the first end of the spool.

6. The seatbelt retractor of claim 3, wherein the magnets are disposed between the first end and the second end of the spool.

7. The seatbelt retractor of claim 1, wherein the spool defines a cavity extending circumferentially about an axis.

8. The seatbelt retractor of claim 7, wherein the magnets are disposed in the cavity.

9. The seatbelt retractor of claim 1, wherein the spool includes a slot extending circumferentially about an axis, the magnets are disposed in the slot.

10. The seatbelt retractor of claim 1, further comprising a webbing having an end, the end of the webbing is attached to the spool.

11. A seatbelt retractor comprising:
a housing;
a spool rotatably supported by the housing;
a torsion bar having a first end and a second end, the first end being fixed to the spool, and the second end being fixable relative to the housing;
a plurality of magnets spaced from each other along the torsion bar, each magnet disposed on the torsion bar;
a rotor on the torsion bar and disposed adjacent the magnets, one of the magnets and the rotor being fixed relative to the spool and the other of the magnets and the rotor being rotatable relative to the spool, the rotor including a conductive material.

12. The seatbelt retractor of claim 11, wherein the magnets each extend circumferentially from the torsion bar.

13. The seatbelt retractor of claim 12, wherein the rotor is disposed between the magnets.

14. The seatbelt retractor of claim 12, wherein the rotor extends circumferentially from the torsion bar.

15. The seatbelt retractor of claim 11, wherein the spool defines a cavity extending circumferentially about an axis.

16. The seatbelt retractor of claim 15, wherein the magnets are disposed in the cavity.

17. The seatbelt retractor of claim 15, wherein the magnets are disposed external to the cavity.

18. A seatbelt retractor comprising:
a housing;
a spool rotatably supported by the housing;
a torsion bar having a first end and a second end, the first end being fixed to the spool, and the second end being fixable relative to the housing;
a plurality of magnets spaced from each other along the torsion bar;
a rotor on the torsion bar and disposed adjacent the magnets, one of the magnets and the rotor being fixed relative to the spool and the other of the magnets and the rotor being rotatable relative to the spool, the rotor including a conductive material;
wherein the spool defines a cavity extending circumferentially about an axis; and
wherein the magnets are disposed in the cavity.

* * * * *